(12) United States Patent
Parker et al.

(10) Patent No.: US 6,761,629 B1
(45) Date of Patent: Jul. 13, 2004

(54) METHODS AND SYSTEMS FOR DETECTING GAS TURBINE ENGINE FUEL LEAKS

(75) Inventors: William Andrew Parker, Greenville, SC (US); Gerald Wilson Grove, Simpsonville, SC (US); Robert Lester Brooks, Greer, SC (US); Mark David D'Ambruoso, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/680,633

(22) Filed: Oct. 7, 2003

(51) Int. Cl.$^7$ .............................................. F02C 7/00
(52) U.S. Cl. ........................ 454/369; 114/211; 454/78
(58) Field of Search .......................... 454/48, 75, 78, 454/370; 114/211

(56) References Cited

U.S. PATENT DOCUMENTS

| | | | |
|---|---|---|---|
| 2,533,339 A | * 12/1950 | Willenborg | 96/397 |
| 3,133,667 A | * 5/1964 | Clifford | 220/88.3 |
| 5,215,497 A | 6/1993 | Drees | |
| 5,520,533 A | 5/1996 | Vrolijk | |
| 5,787,833 A | * 8/1998 | Lewis | 114/211 |
| 5,863,246 A | 1/1999 | Bujak, Jr. | |

* cited by examiner

Primary Examiner—Harold Joyce
(74) Attorney, Agent, or Firm—Armstrong Teasdale LLP

(57) ABSTRACT

A method for detecting a fuel leak in a compartment is provided. The compartment includes at least one inlet and an exhaust outlet that is coupled in flow communication with the compartment and in flow communication with a fan. The method includes determining a fan speed, measuring a fuel leak gas concentration value, determining a fuel leak gas concentration limit value within the compartment based on the determined fan speed, comparing the measured fuel leak gas concentration value with the determined fuel leak gas concentration limit value, and generating at least one of an alarm signal and a trip signal based on the comparison.

30 Claims, 4 Drawing Sheets

METHODS AND SYSTEMS FOR DETECTING GAS TURBINE ENGINE FUEL LEAKS

BACKGROUND OF THE INVENTION

This invention relates generally to gas turbine engines, and more specifically to methods and apparatus for detecting fuel leakage from gas turbine engines installed inside an engine assembly compartment.

Gas turbine engines are used as a power source within a variety of applications. To protect the engine from the environment, and to shield a surrounding environment from the gas turbine engine, at least some known gas turbine engines are contained within an engine assembly compartment that includes an inlet area, an exhaust area, such as an extraction duct, and an engine area that extends between the inlet area and the exhaust area. For example in a power generation facility where the gas turbine engine is used as a power source for an electrical generator, the engine may be housed inside a compartment which facilitates reducing noise and heat generated during engine operation.

Within at least some known compartments, the inlet includes ducts to route ambient air from outside the compartment into the engine compartment for cooling the engine and compartment, and the outlet includes ducts to discharge heated air produced during operation of the engine.

Cooling requirements for a turbine may vary based on operational requirements of the engine, and, as such, at least some known turbine engines use a variable speed cooling fan to control the supply of cooling air channeled to the engine.

However, current regulatory codes may require that an engine control system provide an alarm to an operator and/or automatically stop the engine's operation in an action known as a trip when fuel leakage from the engine within a compartment exceeds a pre-selected limit. At least some known engine assembly compartments may include a hazardous gas detector located in the extraction duct air stream to detect the presence of a fuel leak. A measured concentration at the detector may vary as the air flow rate through the compartment is varied due to the cooling requirements of the engine. For example, for a given leak rate, the measured concentration at the detector may increase as fan speed decreases due to dilution of the fuel in a lesser quantity of air. If a constant hazardous gas detector limit is used when operating at a reduced fan speed, an unnecessary trip of the engine may occur.

BRIEF DESCRIPTION OF THE INVENTION

In one aspect, a method for detecting a fuel leak in a compartment is provided. The compartment includes at least one inlet and an exhaust outlet that is coupled in flow communication with the compartment and in flow communication with a fan. The method includes determining a fan speed, measuring a fuel leak gas concentration value, determining a fuel leak gas concentration limit value within the compartment based on the determined fan speed, comparing the measured fuel leak gas concentration value with the determined fuel leak gas concentration limit value, and generating at least one of an alarm signal and a trip signal based on the comparison.

In another aspect, a leak detection system for detecting a fuel leak in a compartment having an inlet and an extraction duct that is coupled in flow communication with the compartment and in flow communication with a fan is provided. The system includes at least one fuel leak detector, a software code segment programmed to determine a measured fuel leak gas concentration value based on an output signal from said at least one fuel leak detector, determine a fuel leak gas concentration limit value, compare the measured fuel leak gas concentration value with the determined fuel leak gas concentration limit value, and generate at least one of an alarm signal and a trip signal based on the comparison.

DETAILED DESCRIPTION OF THE INVENTION

Figure 1:
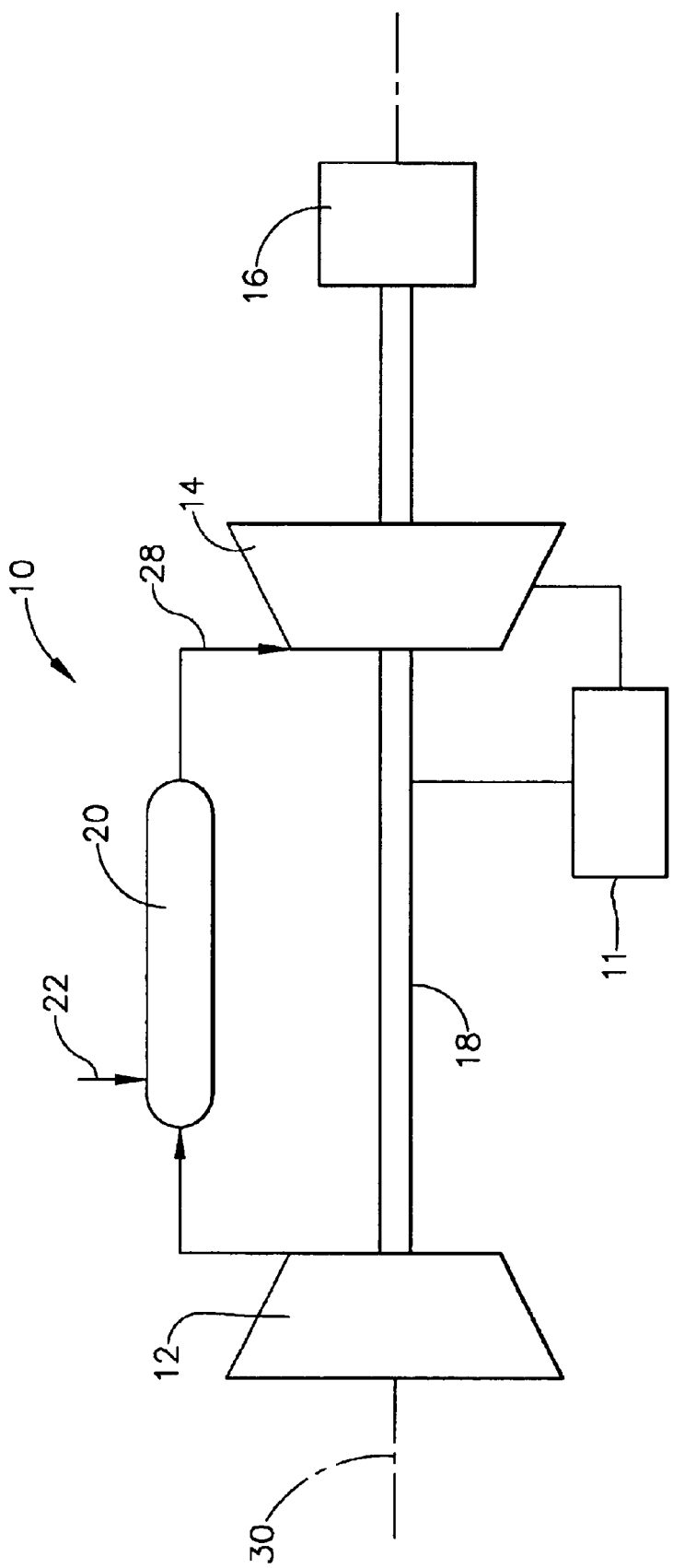
FIG. 1 is a schematic illustration of an exemplary gas turbine engine.

FIG. 1 is a schematic illustration of an exemplary gas turbine engine 10, controlled by a controller 11, and coupled to an electric generator 16. Controller 11 is a processor-based system that includes engine control software that configures controller 11 to perform the below-described processes. As used herein, the term processor is not limited to only integrated circuits referred to in the art as processors, but rather broadly refers to computers, processors, microprocessors, microcontrollers, microcomputers, programmable logic controllers, application specific integrated circuits (ASIC), logic circuits, and any other programmable circuits or processors capable of executing the system as described herein. In the exemplary embodiment, gas turbine system 10 includes a compressor 12, a turbine 14, and a generator 16 arranged in a single monolithic rotor or shaft 18. In an alternative embodiment, shaft 18 is segmented into a plurality of shaft segments, each shaft segment being coupled to an adjacent shaft segment to form shaft 18. Compressor 12 supplies compressed air to a combustor 20 where it mixes with fuel supplied via a stream 22. In one embodiment, engine 10 is a 7FB gas turbine engine commercially available from General Electric Company, Greenville, S.C.

In operation, air flows through compressor 12 and compressed air is supplied to combustor 20. Combustion gases 28 from combustor 20 propels turbines 14. Turbine 14 rotates shaft 18, compressor 12, and electric generator 16 about a longitudinal axis 30.

Figure 2:
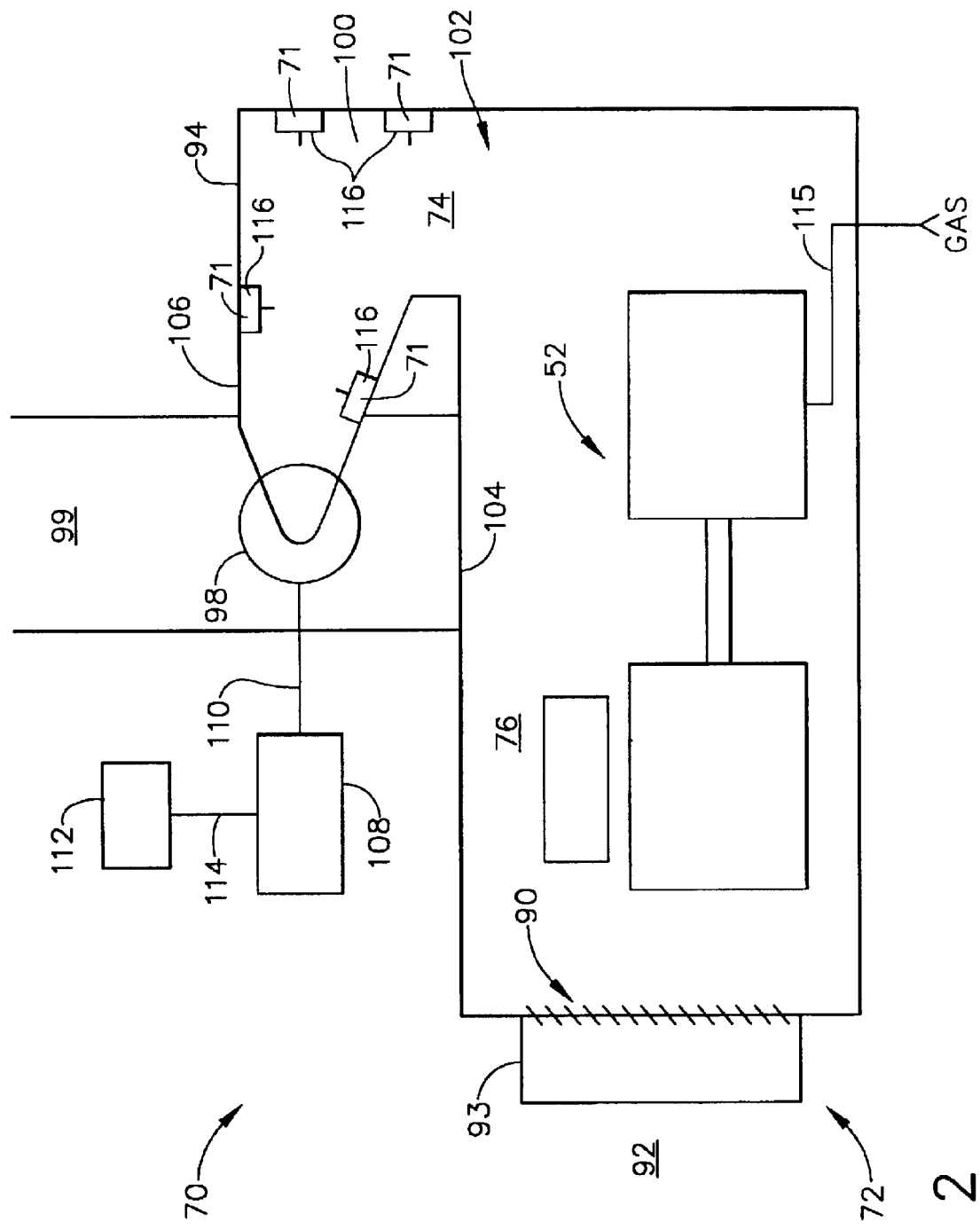
FIG. 2 is a cross-sectional side view of an exemplary gas turbine generator compartment that may be used with the turbine engine shown in FIG. 1.

FIG. 2 is a cross-sectional side view of an exemplary gas turbine generator compartment 70 that may be used with a turbine, such as turbine 10 (shown in FIG. 1). Turbine compartment 70 includes a fuel leak detection system 71, an inlet area 72, an exhaust area 74, and an engine area 76 that extends between inlet and exhaust areas 72 and 74, respectively. More specifically, compartment engine area 76 is sized to receive engine 10 therein. Compartment inlet area 72 includes an inlet damper or louvers duct 90 that is coupled in flow communication between compartment engine area 76 and an ambient air space 92 to receive ambient airflow therethrough. In the exemplary embodiment, inlet damper 90 is also coupled to an acoustic hood assembly 93 to facilitate reducing noise from engine 10 that is transmitted through inlet duct 90.

Compartment exhaust area 74 includes an extraction duct 94 that is coupled in flow communication with a fan housing 98. More specifically, a first end 100 of extraction duct 94 is coupled to an exit opening 102 defined in a ceiling 104 enclosing compartment 70. A second end 106 of duct 94 is coupled to housing 98. The air flow is discharged from the compartment cooling system at a fan discharge 99.

Fan housing 98 includes a fan rotor (not shown) that is rotationally coupled to a motor 108 through a shaft 110. Motor 108 is electrically coupled to a variable speed drive (VSD) 112 through cable 114. VSD 112 controls incoming power to motor 108 to provide a variable speed control of motor 108.

Engine assembly 52 is supplied with fuel through line 115. In the exemplary embodiment, natural gas is supplied to engine assembly 52. In an alternative embodiment, the fuel is any volatile fuel. A plurality of hazardous gas detectors 116 are positioned in several locations within extraction duct 94. In the exemplary embodiment, four detectors are positioned within extraction duct 94 in locations determined by a computational fluids dynamics (CFD) analysis. Detectors 116 transmit signals to controller 11 that are indicative of a concentration of gas measured at each respective detector.

In operation, fan 98 operates over a speed range that delivers a predetermined air flow rate through compartment 70. Operation of motor 108 and fan 98 controls a flow of air from inlet area 92 through inlet damper 90 into engine area 76, and through extraction duct 94 to fan 98. Typically, engine operation at increased power outputs results in an increased demand for cooling air flow. Accordingly, in response to increased demands, controller 11 may increase the speed of fan 98 to increase cooling air flow through compartment 70.

A leak of volatile fuel within compartment 70 may be diluted by the incoming airflow, thereby reducing the concentration of the fuel in the fuel/air mixture leaving compartment 70 through extraction duct 94. However, for a given leak rate and leak location, the fuel concentration in the airstream in extraction duct 94 may be determined with respect to, but not limited to, air flow rate through compartment 70. When the air flow rate through compartment 70 is relatively high, a fuel leak within compartment 70 at a constant rate may result in a lower gas concentration measurement by detectors 116, than a leak at the same rate with a relatively lower air flow rate through compartment 70. To correlate a leak rate and leak location to a gas concentration limit within compartment 70, a CFD may be conducted to determine air flow behavior within compartment 70 at various air flow rates. For example, for a constant, known fuel leak rate the measured gas concentration in extraction duct 94 may vary for each different air flow rate which is proportional to fan speed. Accordingly, a measured gas concentration limit may be adjusted based on the CFD analysis for each speed setting of fan 98. The result is a variable fuel leak concentration limit that changes with fan speed.

Similarly, if a fuel leak occurs proximate exit opening 102, the leaking fuel may not be distributed evenly across opening 102 and as a result fuel leak detection system 71 may be less sensitive to detecting the fuel leak. The CFD may characterize the flow of gas within the exiting airstream such that detectors 116 may be positioned in extraction duct in a location that facilitates achieving an optimum correlation between fuel leak rate and gas concentration detector output. In the exemplary embodiment, the variable limit is embodied in a fuel leak detection system 71 executing in controller 11. In an alternative embodiment, the variable limit may be embodied within a stand-alone leak detection system module that transmits an alarm signal and trip signal to controller 11.

Figure 3:
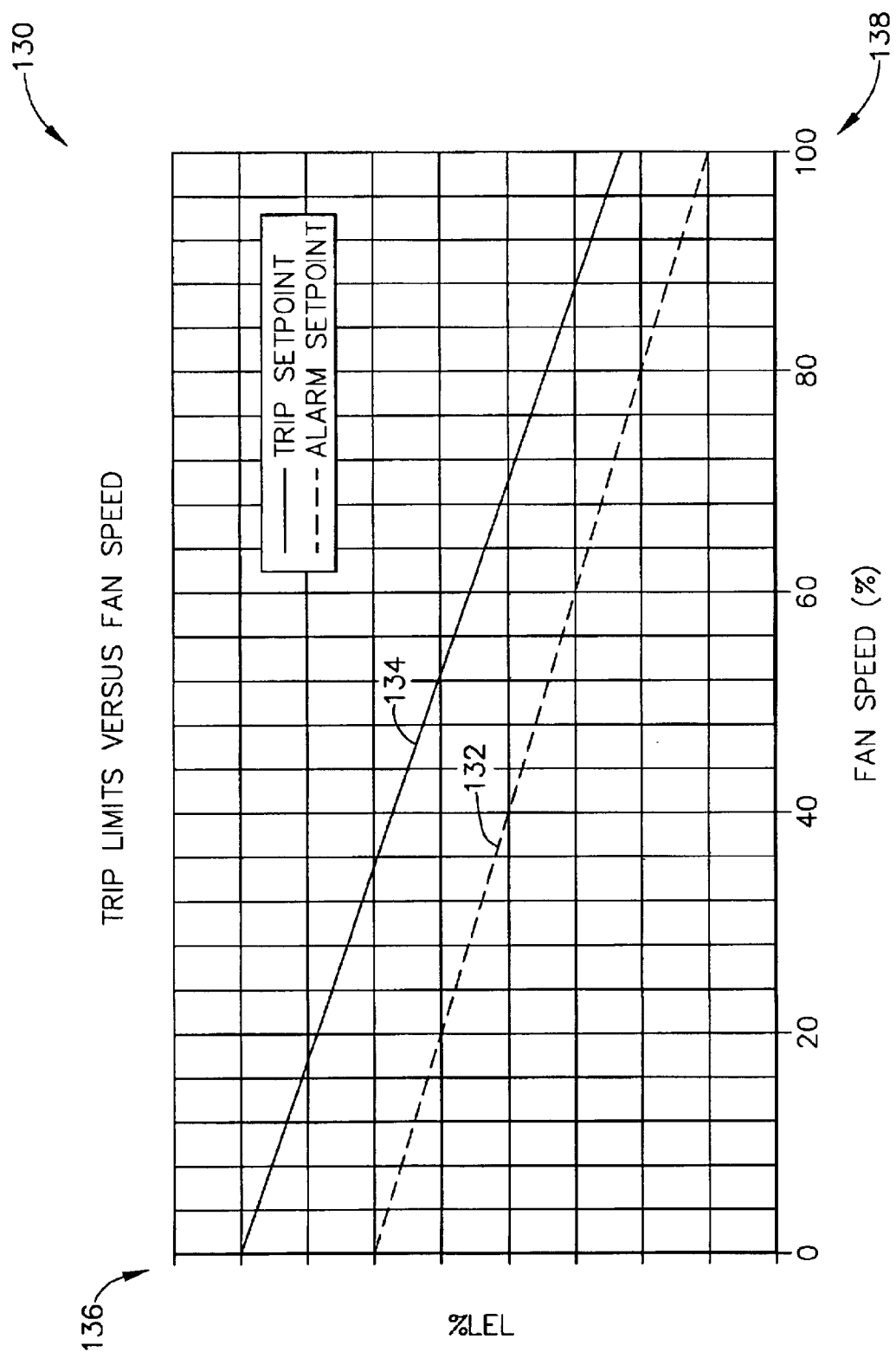
FIG. 3 is a graph of an exemplary alarm setpoint trace and an exemplary trip setpoint trace that may be utilized within the leak detection system.

FIG. 3 is a graph 130 of an exemplary alarm setpoint trace 132 and an exemplary trip setpoint trace 134 that may be utilized within leak detection system 71. A y-axis 136 represents a percent lower explosive limit (LEL) for the fuel type. An x-axis 138 represents a fan speed in percent from a zero speed to a full speed of one hundred percent. In the exemplary embodiment, a CFD determines the amount of dispersion and mixing that occurs at a plurality of leak rates and leak locations. Each leak rate and location corresponds to a fuel leak pocket volume and the CFD determines a detector concentration measurement that corresponds to a leak rate pocket volume for each respective fan speed to ensure the measurement corresponds to the safety code requirement for leak rate pocket volume. In the exemplary embodiment, traces 132 and 134 illustrate a substantially linear proportional relationship between a determined alarm and trip setpoint and fan speed for a given constant fuel leak. As determined by the CFD, the relationship may be non-linear.

Figure 4:
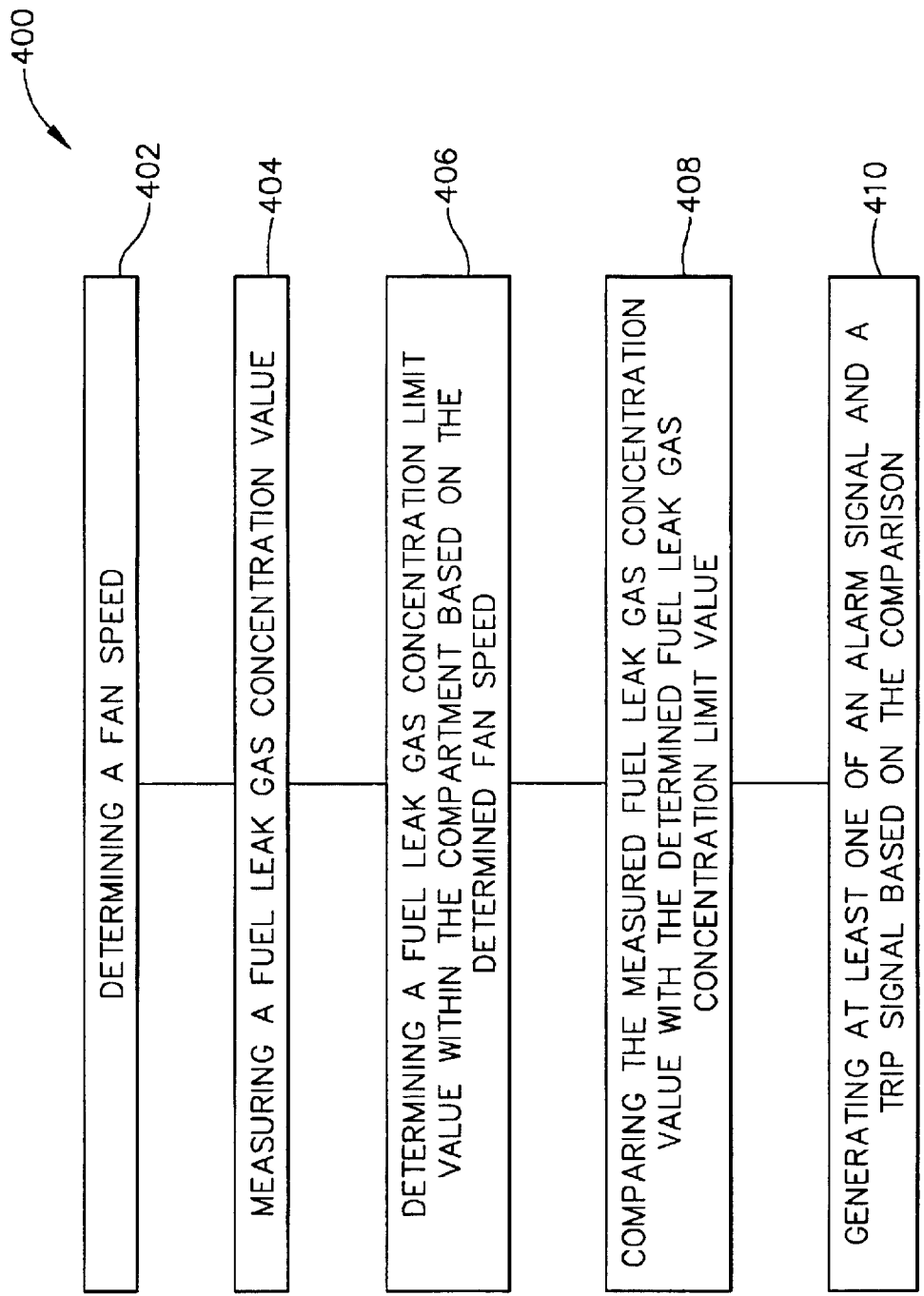
FIG. 4 is a flow diagram illustrating an exemplary method 400 that may be used to detect a hazardous gas leak in the compartment shown in FIG. 2.

FIG. 4 is a block diagram illustrating an exemplary method 400 that may be used to detect a hazardous gas leak in a compartment, such as compartment 70 (shown in FIG. 2). Compartment 70 includes, in serial flow arrangement, at least one inlet opening, an engine area, an extraction duct that includes a first opening in flow communication with the compartment, a second opening in flow communication with a fan, and the fan exhaust stack. The method includes initially determining 402 a speed of the fan. In the exemplary embodiment, fan speed is determined from a speed signal output from the fan variable speed controller. A fuel leak gas concentration value is measured 404 with one or more gas detectors positioned in the extraction duct based on a CFD analysis of the compartment. The CFD is based on several factors including a plurality of leak rates, a plurality of leak locations, flow distribution between the inlet openings, flow patterns within the compartment, gas concentration uniformity in the extraction duct, and a plurality of fan speeds. In the exemplary embodiment, the explosive gas concentration is measured at four locations within the extraction duct wherein the locations are based on the CFD analysis. In an alternate embodiment, a number of measurement locations may be determined by local ordinance requirements or standards. In the exemplary embodiment, the compartment is a gas turbine engine generator enclosure compartment wherein the engine is supplied with a natural gas fuel. In alternative embodiments, the compartment may be, for example, but is not limited to, a fuel tank compartment, a sump, and/or any ventilated area when a volatile fuel is stored and/or used.

A fuel leak gas concentration limit value for a gas fuel leak within the compartment is determined 406 based on the determined fan speed wherein the air flow through the compartment is directly proportional to fan speed. The measured 404 concentration value and the determined 406 fuel leak gas concentration limit are compared 408 in software executing on the controller. A signal proportional to the actual fuel leak gas concentration in the extraction duct is transmitted from the at least one gas concentration detector positioned within the extraction duct. Based on the fan speed signal received from the VSD, the controller 11 determines an alarm setpoint and a trip setpoint for the fuel leak gas concentration limit, and then compares the received gas concentration signal with the determined setpoint. In the exemplary embodiment, the controller generates 410 an alarm signal and/or a trip signal based on the comparison if concentration limits are exceeded. If the determined gas concentration exceeds the alarm setpoint, the operator is alerted to the alarm and additional automatic action may be initiated, such as, but, not limited to, raising fan speed to increase airflow through the compartment. If the determined gas concentration exceeds the trip setpoint, the engine may be tripped automatically and the gas supply system may be secured to repair the leak. Additionally, the controller may infer confirmatory parameters relating to fuel flow and gas concentration to facilitate identifying a source of the leak.

While the present invention is described with reference to detecting a fuel leak and a hazardous gas detector limit that is proportional to fan speed, numerous other applications are contemplated. For example, it is contemplated that the present invention may be applied to any system wherein variable operating conditions of components make setpoints overly restrictive during some operations and overly broad during other operations.

The above-described leak detection system is cost-effective and highly reliable for determining a hazardous gas concentration limit that indicates an undesirable leak rate over variable operating conditions. More specifically, the methods and systems described herein facilitate determining a gas concentration limit setpoint for a first air flow rate through a compartment where a leak may occur, and a different setpoint for a second air flow rate through the compartment wherein the second setpoint is proportional to air flow through the compartment. In addition, the above-described methods and systems facilitate providing an accurate and repeatable gas concentration limit with minimal operator interaction. As a result, the methods and systems described herein facilitate reducing unnecessary engine shutdowns in a cost-effective and reliable manner.

Exemplary embodiments of leak detection systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for detecting a fuel leak in a compartment having at least one inlet and an exhaust outlet that is coupled in flow communication with the compartment and in flow communication with a fan, said method comprising:
   determining a fan speed;
   measuring a fuel leak gas concentration value;
   determining a fuel leak gas concentration limit value within the compartment based on the determined fan speed;
   comparing the measured fuel leak gas concentration value with the determined fuel leak gas concentration limit value; and
   generating at least one of an alarm signal and a trip signal based on the comparison.

2. A method in accordance with claim 1 wherein detecting a fuel leak in a compartment comprises detecting a fuel leak in a gas turbine compartment.

3. A method in accordance with claim 1 wherein the fuel is natural gas and wherein measuring a fuel leak gas concentration value comprises measuring a natural gas leak gas concentration value in the exhaust outlet.

4. A method in accordance with claim 1 wherein the outlet includes an extraction duct, and wherein measuring a fuel leak gas concentration value comprises measuring a fuel leak gas concentration value at a location within the extraction duct.

5. A method in accordance with claim 4 wherein measuring a fuel leak gas concentration value at a location within the extraction duct comprises measuring a fuel leak gas concentration value at a location within the extraction duct determined by a computational fluid dynamics (CFD) analysis.

6. A method in accordance with claim 4 wherein measuring a fuel leak gas concentration value at a location within the extraction duct comprises measuring a fuel leak gas concentration value at four locations within the extraction duct wherein the locations are determined based on a computational fluid dynamics (CFD) analysis.

7. A method in accordance with claim 1 further comprising performing a CFD analysis for the compartment to correlate the fuel leak in the compartment to a measured fuel leak concentration value in the outlet based on a plurality of air flow configurations.

8. A method in accordance with claim 7 further comprising controlling air flow configuration through the compartment with the fan speed.

9. A method in accordance with claim 8 further comprising controlling air temperature within the compartment with the air flow through the compartment.

10. A method in accordance with claim 7 wherein performing a CFD analysis comprises determining a quantity of air flow through the compartment based on the fan speed.

11. A method in accordance with claim 7 wherein performing a CFD analysis further comprises determining a explosive gas concentration limit value based on at least one of a plurality of leak rates, a plurality of leak locations, a flow distribution from the at least one inlet, flow patterns within the compartment, gas concentration uniformity in the extraction duct, and a plurality of fan speeds.

12. A method in accordance with claim 11 wherein determining a fuel leak gas concentration limit value further comprises determining a fuel leak gas concentration limit value further based on the CFD and the fan speed.

13. A method in accordance with claim 1 wherein comparing the measured fuel leak gas concentration value with the determined fuel leak gas concentration limit value comprises:
   receiving a signal proportional to the measured fuel leak gas concentration value in the extraction duct;
   determining a setpoint for the fuel leak gas concentration limit value based on the fan speed; and
   comparing the received signal with the determined setpoint.

14. A method in accordance with claim 1 wherein generating at least one of an alarm signal and a trip signal comprises:
   generating an alarm signal if the measured fuel leak gas concentration value exceeds the determined fuel leak gas concentration limit value by a first magnitude; and
   generating an engine trip signal if the measured fuel leak gas concentration value exceeds the determined fuel leak gas concentration limit value by a second magnitude wherein the second magnitude is greater than the first magnitude.

15. A method for detecting a fuel leak in a gas turbine compartment having an inlet, an extraction duct that includes a first opening in flow communication with the compartment, and a second opening in flow communication with a fan, said method comprising:

performing a computational fluid dynamics (CFD) analysis of at least one of the inlet, the compartment, the extraction duct, the fan, at least one component within the compartment, and at least one component within the extraction duct;

determining a location for at least one fuel leak gas concentration monitor based on the CFD wherein an output signal from each fuel leak gas concentration monitor corresponds to a fuel leak pocket volume within the compartment;

determining a measured fuel leak gas concentration value in the compartment using an output signal from each fuel leak gas concentration monitor measured within the extraction duct; determining a fuel leak gas concentration limit value for gas within the extraction duct that is proportional to fan speed, the limit based on the CFD;

comparing the measured fuel leak gas concentration value to the determined fuel leak gas concentration limit value; and generating an alarm signal if the measured fuel leak gas concentration value exceeds the determined fuel leak gas concentration limit value by a first magnitude; and generating a trip signal if the measured fuel leak gas concentration value exceeds the determined fuel leak gas concentration limit value by a second magnitude wherein the second magnitude is greater than the first magnitude.

16. A method in accordance with claim 15 wherein determining a measured fuel leak gas concentration value in the extraction duct comprises measuring a fuel leak gas concentration value at four locations within the extraction duct.

17. A method in accordance with claim 15 wherein determining a fuel leak gas concentration limit value further comprises determining fuel leak gas concentration limit value based on at least one of a plurality of leak rates, a plurality of leak locations, flow distribution from an inlet, flow patterns within the compartment, gas concentration uniformity in the extraction duct, and a plurality of fan speeds.

18. A leak detection system for detecting a fuel leak in a compartment having an inlet and an extraction duct that is coupled in flow communication with the compartment and in flow communication with a fan, said system comprising:

at least one fuel leak detector;

a software code segment programmed to:

determine a measured fuel leak gas concentration value based on an output signal from said at least one fuel leak detector;

determine a fuel leak gas concentration limit value;

compare the measured fuel leak gas concentration value with the determined fuel leak gas concentration limit value; and generate at least one of an alarm signal and a trip signal based on the comparison.

19. A leak detection system in accordance with claim 18 wherein the compartment comprises a gas turbine compartment.

20. A leak detection system in accordance with claim 18 wherein the fuel is natural gas.

21. A leak detection system in accordance with claim 18 wherein said at least one detector is positioned within said extraction duct.

22. A leak detection system in accordance with claim 21 wherein said at least one detector is positioned in said extraction duct at a location determined by a computational fluid dynamics (CFD) analysis.

23. A leak detection system in accordance with claim 18 wherein said fuel leak gas concentration limit value is determined using said CFD analysis.

24. A leak detection system in accordance with claim 23 wherein said CFD analysis correlates the fuel leak in the compartment to the measured fuel leak gas concentration value.

25. A leak detection system in accordance with claim 18 wherein a flow of air through the compartment is proportional to the speed of the fan.

26. A leak detection system in accordance with claim 25 wherein the temperature within the compartment is proportional to the flow of air through the compartment.

27. A leak detection system in accordance with claim 18 wherein the fuel leak gas concentration limit value is determined based on at least one of a plurality of leak rates, a plurality of leak locations, flow distribution from the inlet, flow patterns within the compartment, gas concentration uniformity in the extraction duct, and a plurality of fan speeds.

28. A leak detection system in accordance with claim 26 wherein the explosive gas concentration limit is determined based on the CFD and the fan speed.

29. A leak detection system in accordance with claim 18 wherein the software code segment is further configured to:

receive a signal proportional to the actual explosive gas concentration in said extraction duct;

determine a setpoint for said explosive gas concentration limit based on the fan speed; and compare the received signal with said determined setpoint.

30. A leak detection system in accordance with claim 18 wherein said software code segment is further configured to:

generate an alarm signal if the actual explosive gas concentration exceeds said determined explosive gas concentration limit by a first magnitude; and generate a trip signal if the actual explosive gas concentration exceeds said determined explosive gas concentration limit by a second magnitude wherein said second magnitude is greater than said first magnitude.

* * * * *

UNITED STATES PATENT AND TRADEMARK OFFICE
CERTIFICATE OF CORRECTION

PATENT NO.     : 6,761,629 B1
DATED          : July 13, 2004
INVENTOR(S)    : Parker et al.

It is certified that error appears in the above-identified patent and that said Letters Patent is hereby corrected as shown below:

Column 6,
Line 13, delete "duet" and insert therefor -- duct --.

Signed and Sealed this

Twenty-third Day of August, 2005

JON W. DUDAS
*Director of the United States Patent and Trademark Office*